Patented Mar. 7, 1939

2,149,286

UNITED STATES PATENT OFFICE 2,149,286

POLYAMIDES

George De Witt Graves, Wilmington, Del., assignor to E. I. du Pont de Nemours & Company, Wilmington, Del., a corporation of Delaware No Drawing. Application January 13, 1937, Serial No. 120,459

14 Claims. (Cl. 260—2)

This invention relates to synthetic resins and more particularly to new polyamide resins.

In Patent 2,071,250, there are described polyamides obtained by reacting diamines and dibasic acids. These polyamides are valuable in that they may be drawn into useful fibers but they are of limited value in the coating art because of their crystallinity and limited solubility characteristics.

This invention has as an object the preparation of new and useful polymeric products. A further object is to prepare resinous polyamides of improved properties. A still further object is to prepare products useful in the plastic, molding, coating, sizing, adhesive, impregnating and related arts. Other objects will appear hereinafter.

These objects are accomplished by heating under amide-forming conditions a polyamine, a non-imide-forming polycarboxylic acid, and a drying oil acid, until a resinous product is obtained. It is to be understood that the mention of polybasic acid and drying oil acid means also the amide-forming derivatives of these acids.

I have found that the polymers obtained by reacting diamines and dibasic acids are greatly improved as coating composition ingredients by including in the reaction mixture a drying oil acid or an amide-forming derivative thereof.

Introduction of the drying oil radical imparts improved drying properties, toughness, and durability. This modification can be accomplished by the methods indicated below.

The products of this invention are made by heating a mixture of a polyamine, a non-imide-forming polybasic acid, and a drying oil acid under amide-forming conditions until a polymer of the desired properties is obtained. Amide-forming derivatives of the polybasic acid or drying oil acid, i. e., an ester with a monohydric alcohol, an anhydride, an acid halide, or an amide can be used in place of the free acid. The reaction by which the products are obtained may be carried out in the absence of a solvent (fusion method), in the presence of a solvent, or in the presence of a non-solvent diluent. The reaction temperature required to obtain the polymeric product differs somewhat with the nature of the reactants employed but is generally in the neighborhood of 100–300° C. and preferably 180°–275° C. When the free acids are used the temperature required is usually above 180° C. The reaction by which the polymers are obtained may be described as a condensation polymerization; it involves the formation of a by-product, such as water, alcohol, phenol, hydrogen chloride or ammonia, depending upon the derivative of the acid employed. Generally, it is desirable to effect the reaction under conditions which permit the escape of the water or other by-products, but this is not always essential. The reaction is preferably carried out in the absence of air and sometimes the addition of antioxidants is desirable. It is usually unnecessary to add a catalyst, but inorganic materials of alkaline reaction, such as oxides, carbonates, and acidic materials, such as halogen salts of polyvalent elevents, e. g., aluminum, zinc, or tin, are often helpful. The reaction may be carried out in an open or closed reactor; atmospheric, super-atmospheric, or sub-atmospheric pressures may be used.

The term "polyamine" is used herein to indicate an organic amine containing at least two hydrogen-bearing nitrogen atoms, i. e., primary or secondary amino groups. Thus ethylene-diamine, $NH_2CH_2CH_2NH_2$, is a polyamine containing two functional amino groups, whereas triethylenetetramine,

$NH_2CH_2CH_2NHCH_2CH_2NHCH_2CH_2NH_2$ is a polyamine containing four functional amino groups. The primary amino groups undergo amide formation more readily than the secondary amino groups. Tertiary amino groups do not take part in amide formation.

The polycarboxylic acid used in the preparation of polyamides of this invention must be non-imide-forming. The term "non-imide-forming" is used to exclude such acids as succinic and phthalic which tend to undergo cyclization and imide-formation in preference to linear polyamide formation when heated with a primary amino group. The present invention therefore can be practiced only with polybasic acids which have little tendency to form imides from their amides when the latter are heated under conditions for resin formation. The acids used in the present process include dibasic acids having a chain of three or more atoms joining the carboxyl groups (e. g., glutaric acid). Dibasic acids having a chain of four or more atoms joining the carboxyl groups (e. g., adipic) have almost no tendency to form imides and therefore comprise a preferred class. However, certain acids having a chain of less than three atoms joining the carboxyl groups, e. g., oxalic and malonic acids, can be used with some success. The polybasic acid employed will usually be dibasic but acids containing more than two carboxyl groups, such as tricarballylic acid, may also be used. It is to understood that the polycarboxylic acids mentioned in the claims include the amide-forming derivatives of those acids.

The products of this invention are oil modified polyamides. This means that, in addition to the polyamine and the polybasic acid or amide-forming derivative thereof, a drying oil acid or an amide-forming derivative thereof is used in their preparation. It is desirable to incorporate the drying oil acid with the polyamine and the polybasic acid prior to the preparation of the polyamide. However, it is possible to react the preformed polyamide, i. e., polyamine-polybasic acid condensation product, with a drying oil acid.

The following examples, in which the parts are by weight, illustrate the invention:

EXAMPLE I

*Sebacic acid, linseed oil acids, and triethylenetetramine*

A mixture of 24.2 parts of sebacic acid, 14.4 parts of linseed oil acids, and 11 parts of triethylenetetramine was heated, with mechanical stirring, for 1.7 hours in a bath at 100–192° C. and then for 1.5 hours at 192–204° C. The clear, amber oil-modified polyamide thus obtained was resinous; it was brittle below 10° C., rubbery from 10 to 45° C., and soft above 45° C. It had an acid number of 20. It was soluble in alcohols and in mixtures of ethanol with toluene or ethyl acetate, and insoluble in water. Films flowed from its solutions and baked at 100° C. were clear, tough, and not affected by hot water.

EXAMPLE II

*Diphenylolpropanediacetic acid, linseed oil acids, and diethylenetriamine*

A mixture of 43 parts of diphenylolpropanediacetic acid, 14.4 parts of linseed oil acids, and 11 parts of diethylenetriamine was heated, with mechanical stirring, for one hour in a bath at 175–190° C. and then for one hour at 220–228° C. The product was an amber-brown resin which softened at 60–65° C., had an acid number of 20, and was soluble in toluene-ethanol mixtures and in tetrachloroethane, and insoluble in water. When air dried or baked over a primer on metal, it showed good adhesion and aging characteristics. Exposure tests on wood panels also showed good aging qualities. It was compatible with polyhydric alcohol-polybasic acid resins.

EXAMPLE III

*Adipic acid, linseed oil acids, and decamethylenediamine*

A mixture of 43 parts of decamethylenediamine, 18.2 parts of adipic acid, and 70 parts of linseed oil acids was heated, with stirring, in a bath at 200–210° C. for one-half hour and then at 220–225° C. for two hours, allowing the water formed in the reaction to distill out. The product was a tan-colored, wax-like material which was somewhat harder than beeswax and melted at 160–165° C. It was insoluble in water and in the common lacquer solvents but was soluble in hot ethylenechlorohydrin and in glacial acetic acid. It had an acid number of 40.

EXAMPLE IV

*Adipic acid, linseed oil acids, and hexamethylenediamine*

A mixture of 52.4 parts of hexamethylene diammonium adipate (the salt derived from hexamethylenediamine and adipic acid), 2.8 parts of linseed oil acids, 0.58 part of hexamethylenediamine, and 50 parts of phenol (solvent) was heated for six hours in a bath at 200–210° C., allowing the water and some phenol to distill out. The oil-modified polyamide was precipitated as a white, granular material which melted at about 228° C. It was insoluble in water and in the common lacquer solvents but was soluble in formic acid and in phenol. It had an intrinsic viscosity of 0.41.

EXAMPLE V

*Fumaric acid, linseed oil acids, and decamethylenediamine*

A mixture of 5.8 parts of fumaric acid, 17.2 parts of decamethylenediamine, and 28.0 parts of linseed oil acids was heated in a bath at 200° C. for one hour. The oil-modified polyamide thus obtained was light-brown and had the consistency of beeswax. It softened at about 80° C., had an acid number of 5, and was soluble in alcohols and aromatic hydrocarbons. It was insoluble in water.

EXAMPLE VI

*Adipic acid, China-wood oil acid, decamethylenediamine, phenol, and formaldehyde*

A mixture of 47 parts of phenol, 40.5 parts of 37% formaldehyde, and 3 parts of 28% ammonia was heated an hour on the steam bath. The viscous resinous layer which separated was combined with 43 parts of decamethylenediamine, 28.8 parts of China-wood oil acids, and 29.2 parts of adipic acid and the whole heated, with stirring, for 1.5 hours in a bath at 115–120° C. and then for 0.5 hour up to 225° C. The product was a clear, yellow, tough resin which could be manually drawn into brittle filaments. It softened at 30–35° C., and was insoluble in water but soluble in cresol and in formic acid. A film cast from a formic acid solution was transparent, brown and tough. It would be heat-hardened to the extent that it was not affected by boiling water.

The examples illustrate the preparation of oil-modified polyamides from various polyamines, non-imide-forming polybasic acids, and drying oil acids. As examples of other polyamines which may be used might be cited ethylenediamine, tetramethylenediamine, octamethylenediamine, para-xylylenediamine, di-(hexamethylene) triamine, piperazine, tetramethyl piperazine, N-phenylethylenediamine, and N-N'-dimethyl ethylenediamine. Further examples of polybasic acids which may be used are glutaric, pimelic, suberic, azelaic, beta-methyl adipic, camphoric, tricarballylic, dithioglycolic, diphenylolpropane diacetic, and resorcinol diacetic. Some acid of the imide-forming type, e. g., phthalic acid and maleic, can be used in conjunction with the non-imide-forming dibasic acid.

The examples illustrate the use of linseed oil acids and China-wood oil acids in the preparation of oil-modified polyamides. As examples of other drying oils or semi-drying oils whose acids or amide-forming derivatives may be used are: oiticica oil, fish oil, perilla oil, sardine oil, sunflower oil, soya bean oil, and castor oil. It is within the scope of this invention to use more than one polyamine, polycarboxylic acid, or drying oil acid in the preparation of the oil-modified products. As illustrated in Example VI, the oil-modified polyamides may be modified with additional reagents. It is, for example, possible to use resin acids, such as those of congo and rosin, either alone or in conjunction with the drying oil acids.

The products of this invention are for the most part resins whose softening point and solubility are dependent upon the reactants used in their preparation and upon the proportion of drying oil acid used. In general, the products are soluble in chlorinated hydrocarbons, esters, hydroxy ethers, phenols, and mixtures of alcohols with aromatic hydrocarbons, and insoluble in water. Owing to the presence of the drying oil acid radical the products tend to become insoluble on continued heating or on exposure to air. This is probably due to polymerization of the drying oil type. This property of the product to become insoluble, i. e., harden, on exposure to air is a very desirable property when the product is to be used in the preparation of coating compositions. The change to the insoluble state is accelerated by various catalysts, e. g., benzoyl peroxide, and by driers, e. g., metallic driers of the type used in paint compositions. Films obtained from the products of this invention are hard, tough, durable, and resistant to water. The products may also be used in the preparation of plastics, sizing, impregnating, adhesive, and related compositions.

As previously indicated, oil-modified polyamides may be prepared by treating the preformed polyamides with drying oil acids. When this method is followed, however, it is difficult to introduce a large proportion of drying oil acids into the polyamides.

In the preparation of the products of this invention the acids and amines should be used in such proportions that the reactive amino and acid groups will be present substantially in equimolecular amounts. This leads to water-insoluble products of low acid number. The most desirable products are obtained by heating the reaction mixture until the acid number is below 40. While the quantity of drying oil acid used may be varied within wide limits it is generally necessary that at least 10% of the acid constituent shall consist of drying oil acid if a significant improvement in the resin due to oil modification is to be obtained. Although the drying oil acid can be made the principal acid reactant, some polybasic acid is necessary to secure the polymeric products of this invention. The amount of drying oil acid should generally not exceed 90% of the acid constituents. If no polybasic acid is employed, i. e., if a polyamine is reacted with a drying oil acid alone, oily products analogous to drying oils (glycerides) are obtained. This invention is not concerned with these products.

Example IV illustrates the preparation of an oil-modified polyamide in the presence of phenol as a solvent. Phenols are very useful for this purpose, but other classes of compounds which are inert toward the reactants and reaction products may also be used. Alcohols, ketones, and ethers can be used as solvents in the reaction. When it is desired to use the reaction product directly in the preparation of a coating composition, it is advantageous to select a solvent which can be volatilized without too much difficulty. It is also possible to prepare the oil-modified polyamides in the presence of diluents which are solvents for the reactants but not for the reaction products. This is often a convenient method for securing the reactants in intimate contact and at the same time avoiding the necessity for separating the reaction products from a solvent. Products of this invention can be prepared in the presence of other materials, such as film-forming materials of the class consisting of resins, cellulose derivatives, plasticizers, pigments, fillers, etc.

The products illustrated in the examples were prepared in open reactors at atmospheric pressure. In some cases it is desirable in order to secure light-colored products to carry out the reaction in the absence of air. This may be done by using closed reactors from which the air has been excluded or by blanketing the reaction mixture with an inert gas, such as nitrogen. The reaction can be carried out at super-atmospheric or sub-atmospheric pressure. Agitation of the reaction mixture is generally desirable, since it insures thorough mixing of the reactants and prevents local superheating.

This invention provides an economical and convenient method for preparing polyamides having film-forming properties which are especially useful in the preparation of coating compositions. Products of widely different properties can be prepared by this invention by varying the reactants and the proportions in which they are used. This invention provides a method for chemically combining into a single product the properties of a resin and a drying oil. The products therefore are very useful in the preparation of coating compositions of the type which normally require both a resin and a drying oil. For this purpose the oil-modified polyamides are superior to physical mixtures of polyamides and drying oils. While the oil-modified polyamides are particularly useful in the coating composition field, they are also useful in the preparation of molding, plastic, sizing, impregnating, and adhesive compositions. In these various applications as well as in the preparation of coating compositions, the products of this invention can be mixed with one another or with other agents, such as plasticizers, resins, cellulose derivatives, pigments, fillers, dyes, and the like.

As many apparently widely different embodiments of this invention may be made without departing from the spirit and scope thereof, it is to be understood that I do not limit myself to the specific embodiments thereof except as defined in the appended claims.

I claim:

1. A process for making oil-modified resinous compositions which comprises heating with a drying oil acid a substance of the class consisting of polyamides and a reaction mixture producing said polyamides, said polyamides consisting essentially of the reaction product of a polyamine having at least two amino nitrogen atoms which are attached to aliphatic carbon atoms and which carry at least one hydrogen atom, and an aliphatic non-imide-forming polybasic carboxylic acid.

2. A process which comprises heating under amide-forming conditions until a resinous product is obtained, a reaction mixture consisting essentially of a polyamine having at least two amino nitrogen atoms which are attached to aliphatic carbon atoms and which carry at least one hydrogen atom, a non-imide-forming polycarboxylic acid, and a drying oil acid.

3. A process which comprises heating, at 180° to 275° C. under amide-forming conditions until a resinous product of acid number below 40 is obtained, a reaction mixture consisting essentially of a polyamine having at least two amino nitrogen atoms which are attached to aliphatic carbon atoms and which carry at least one hydrogen atom, a non-imide-forming polycarboxylic acid, and a drying oil acid, the reactive amino and acid groups in said mixture being present in substantially equimolecular amounts and the drying oil acid being at least 10% of the acid constituents.

4. The process set forth in claim 2 in which said polycarboxylic acid is a dicarboxylic acid.

5. The process set forth in claim 2 in which said polycarboxylic acid is a dicarboxylic acid having a chain of at least three atoms joining the carboxyl groups.

6. The process set forth in claim 3 in which said polycarboxylic acid is a dicarboxylic acid.

7. The process set forth in claim 3 in which the reaction is carried out in the presence of an inert solvent.

8. The polymeric reaction product of ingredients consisting essentially of a non-imide-forming polycarboxylic acid, a drying oil acid, and a polyamine having at least two amino nitrogen atoms which are attached to aliphatic carbon atoms and which carry at least one hydrogen atom.

9. The product set forth in claim 8 in which said polycarboxylic acid is a dicarboxylic acid.

10. The product set forth in claim 8 in which said polycarboxylic acid is a dicarboxylic acid having a chain of at least three carbon atoms joining the carboxyl groups.

11. A polymeric product of acid number below 40 comprising the reaction product of ingredients consisting essentially of a polyamine having at least two amino nitrogens which are attached to aliphatic carbon atoms and which carry at least one hydrogen atom, a non-imide-forming polycarboxylic acid, and a drying oil acid, the reactive amino and acid groups in said ingredients being present in substantially equimolecular amounts and said drying oil acid comprising at least 10% of the acid ingredients.

12. The product set forth in claim 11 in which said polycarboxylic acid is a dicarboxylic acid.

13. The product set forth in claim 11 in which said polycarboxylic acid is an aliphatic dicarboxylic acid having a chain of at least three carbon atoms joining the carboxyl groups.

14. The product set forth in claim 11 in which said polyamine is an aliphatic diprimary diamine and said polycarboxylic acid is an aliphatic dicarboxylic acid having a chain of at least three carbon atoms joining the carboxyl groups.

GEORGE DE WITT GRAVES.